United States Patent
Sass et al.

(10) Patent No.: US 6,413,561 B1
(45) Date of Patent: Jul. 2, 2002

(54) ACIDIC DRINK

(76) Inventors: Matthias Sass, Schaelzigweg 79, Schwetzingen D-68723 (DE); Susanne Rimmler, D 6,1, Mannheim D-68159 (DE)

( * ) Notice: Subject to any disclaimer, the term of this patent is extended or adjusted under 35 U.S.C. 154(b) by 0 days.

(21) Appl. No.: 09/485,664

(22) PCT Filed: Aug. 12, 1998

(86) PCT No.: PCT/EP98/05112

§ 371 (c)(1),
(2), (4) Date: Jun. 19, 2000

(87) PCT Pub. No.: WO99/08541

PCT Pub. Date: Feb. 25, 1999

(30) Foreign Application Priority Data

Aug. 14, 1997 (DE) .......................... 197 35 385

(51) Int. Cl.⁷ ............................ A23L 2/00; A23L 1/304
(52) U.S. Cl. .......................................... 426/74; 426/590
(58) Field of Search ................. 426/590, 597, 426/582, 74, 120, 124, 591

(56) References Cited

U.S. PATENT DOCUMENTS

| | | | |
|---|---|---|---|
| 2,818,342 A | | 12/1957 | Ransom |
| 2,853,386 A | | 9/1958 | Hughes |
| 3,305,368 A | * | 2/1967 | Bourelle ................. 426/120 |
| 3,692,532 A | | 9/1972 | Shenkenberg et al. |
| 3,741,383 A | * | 6/1973 | Wittwer .................. 426/120 |
| 3,743,520 A | * | 7/1973 | Croner ................... 426/120 |
| 4,212,893 A | | 7/1980 | Takahata |
| 4,676,988 A | * | 6/1987 | Efstathiou et al. ........ 426/271 |
| 4,737,375 A | * | 4/1988 | Nakel et al. ............. 426/590 |
| 4,738,856 A | * | 4/1988 | Clark .................... 426/74 |
| 4,871,554 A | * | 10/1989 | Kalala et al. ............ 426/74 |
| 4,992,282 A | * | 2/1991 | Mehansho et al. ......... 426/72 |
| 5,185,166 A | * | 2/1993 | Nakagawa ................ 426/74 |
| 5,389,387 A | * | 2/1995 | Zuniga et al. ........... 426/74 |
| 5,401,524 A | * | 3/1995 | Burkes .................. 426/74 |
| 5,422,128 A | * | 6/1995 | Burkes .................. 426/74 |
| 5,609,897 A | * | 3/1997 | Chandler et al. ......... 426/73 |
| 5,817,351 A | * | 10/1998 | DeWille et al. .......... 426/74 |
| 6,080,431 A | * | 6/2000 | Andon ................... 424/602 |
| 6,171,633 B1 | * | 1/2001 | Dulebohn et al. ......... 426/580 |
| 6,180,130 B1 | * | 1/2001 | Chen et al. ............. 426/439 |

FOREIGN PATENT DOCUMENTS

| | | |
|---|---|---|
| DE | 546542 | 2/1932 |
| DE | 2145451 | 3/1972 |
| DE | 19607749 A1 | 9/1997 |
| EP | 0 138 690 A2 | 10/1984 |
| EP | 0 385 051 A1 | 6/1989 |
| EP | 0 408 756 A1 | 12/1989 |
| EP | 0 384 816 A2 | 2/1990 |
| EP | 0 449 354 B1 | 3/1991 |
| EP | 0 521 707 B1 | 7/1992 |
| EP | 0 521 707 A1 | 7/1992 |
| EP | 0 765 609 A2 | 9/1996 |
| HU | 96-232990/24 | 9/1995 |
| JP | 55050885 A | 4/1980 |
| JP | Al 60012930 | 1/1985 |
| RU | 97-152632/14 | 7/1996 |
| WO | WO 96/29880 | 2/1996 |

OTHER PUBLICATIONS

Lee, 1975. Basic Food Chemistry. The AVI Publishing Company, Inc., Westport, CT, p. 260, 274.*
Webb, 1965. Fundamentals of Dairy Chemistry, The AVI Publishing Company, Inc., Westport, CT, p. 6, 8, 17.*
Von Rudolf Bruncke, "Milchwirtschaft und Dauermilchindustrie," Fachbuchverlag Leipzig (Berlin), p. 111–112, (1958).

* cited by examiner

Primary Examiner—Carolyn Paden
(74) Attorney, Agent, or Firm—Jenkins & Wilson, P.A.

(57) ABSTRACT

The present invention relates to an acid beverage with improved stability. The beverage contains at least one fat, one hydrocolloid, one milk protein, calcium and magnesium ions, at a pH of 3.5 to 4.5.

14 Claims, No Drawings

ACIDIC DRINK

The present invention relates to an acid beverage with improved long-term stability, to a method of producing the same and to a kit containing the basic constituents of the beverage.

BACKGROUND ART

Milk-containing beverages have already been known since a long time. As early as 1905 the preparation of impregnated skimmed milk ("champagne milk") was described, which was sweetened and aromatized by adding flavors. In Japan a sour milk beverage which is prepared by using lactobacillus cultures has already been on the market since 1935. This beverage based on fermented dairy products can also be refined with respect to its flavor with the help of a multitude of additives.

U.S. Pat. No. 5,260,085 describes a milk-containing beverage which contains water, milk solids, flavoring substances and a 2-component stabilizer system of monoglycerides and diglycerides as well as carrageenan and/or pectin. The beverage further contains a buffer system of sodium phosphate and potassium hydroxide to keep the pH between 6.3 and 6.5.

DISCLOSURE OF THE INVENTION

U.S. Pat. No. 5,202,145 describes a method for producing a milk-containing beverage in which a homogenized composition of water, milk solids and a 2-component stabilizer system is mixed with an aqueous buffered solution provided with a flavorant and is subsequently heated. The 2-component stabilizer system contains a mixture consisting of a first component containing monoglycerides and up to 10% by wt. of diglycerides, and of a second component containing carrageenan and/or pectin. The buffer system consists of a mixture of sodium phosphate and potassium bicarbonate and has a pH of 6.8 to 7.2. The whole amount of potassium bicarbonate is converted by heating into potassium hydroxide and carbon dioxide, the pH of the beverage being adjusted to 6.3 to 6.5. The mik solids used have a milk fat content of at least 15% and a milk protein content of at least 25%, based on the weight of the milk solids used. The content of milk solids in the beverage is 1% by weight.

Although milk protein is sensitive to acid substances, resulting in coagulation and precipitation in the presence of acid-containing substances, such as fruit juices, there are quite a large number of milk-containing beverages with a pH above 3.0.

GB-A-1315718 describes a method for producing an acid milk beverage in which a mixture containing skimmed milk is set to a pH of 3.5 to 3.7 by adding suitable acids. The resulting beverage has a white milk-like turbidity.

U.S. Pat. No. 4,194,019 describes a method for producing a stabilized, acid, milk-containing beverage. Skimmed milk is first set to a pH of 3.35 to 3.75 by adding an acid or by fermentation. The mixture is subsequently subjected to an ultra-heat temperature (UHT) treatment at 125° C. to 160° C. for not more than 10 seconds.

EP-B-449354 (DE-B-69101166) describes a method for producing an acid calcium-enriched fermented-milk beverage. To avoid stability problems during pasteurization, and prior to the bottling of the finished beverage, the concentration of the dry substances is increased in the milk to be fermented. Furthermore, a stabilizer and a small amount of a magnesium salt are added to the beverage.

The known milk-containing beverages have several drawbacks. As for their appearance and their flavor, the milk-containing beverages with an almost neutral pH are very similar to milk and have a heavy viscous character. In particular with respect to smell, flavor and texture, the milk-like appearance of these beverages is evaluated in a negative way. Thus they lack the refreshing acid character which can e.g. be achieved by adding edible acids or carbon dioxide. Often the beverages have flaws in the form of fat rings in the bottle neck or a very solid bottom sediment.

Acid milk-containing beverages exhibit heavy viscous characteristics due to the raw materials used, such as yoghurt or curdled milk, or due to their high milk content. The drinking pleasure rather resembles the consumption of a complete meal.

On account of the high viscosity and the low storage quality, which additionally requires an uninterrupted cooling chain, flaws in the beverage, such as ring formation, are not so often observed or are concealed by a suitable packaging (opaque cups) or consumption instructions (shake well before use). Moreover, a high-concentrate product cannot be obtained with the above-described methods. It is thus impossible to locate production and beverage bottling facilities at a great spatial distance from one another.

It is the object of the present invention to provide an acid beverage which exhibits a better storage stability than known acid beverages, and a method for producing the same, as well as a kit containing the basic constituents of the beverage.

This object is achieved by an acid beverage which contains at least one fat, one hydrocolloid, one milk protein and calcium and magnesium ions, at a pH of 3.5 to 4.5.

Preferably, the beverage contains 0.003 to 3.8 g/l of at least one fat, 0.1 to 10 g/l of at least one milk protein, 0.01 to 10 g/l of at least one hydrocolloid, 0.1 to 1.2 g/l calcium ions and 0.01 to 0.7 g/l magnesium ions.

The beverage according to the invention has excellent sensory characteristics, imparts good palatability and has a refreshing character.

The fat used in the beverage according to the invention may derive from any desired vegetable, animal or synthetic fats or fat sources or mixtures thereof.

The fat source used is preferably milk, usually cow milk, having a fat content of 0.3 to 4%, commercially available milk varieties (with fat contents of from 1.5 to 3.9%) being preferably used because of their easy availability. However, it is also possible to use milk concentrates or milk reconstituted from milk powder. Vegetable or animal fat sources are e.g. soybean oil, sunflower oil, rape oil, linseed oil, cottonseed oil or coconut fat or tallow, respectively, lard or butter.

The total fat content in the beverage is normally 0.003 to 3.8 g/l, preferably 0.03 to 1.5 g/l and particularly preferably 0.1 to 0.5 g/l.

The milk protein added to the beverage according to the invention is a protein found in natural milk or a mixture thereof. Said milk proteins are proteins such as caseins, whey proteins, minor components, such as fat globule membrane proteins or butyrophilin, or enzymes. Preferred are whey proteins, such as β-lactoglobulin, α-lactalbumin, serum albumin, immunoglobulins or procous peptones. α-lactalbumin is particularly preferred as the whey protein.

The total milk protein content of the beverage is suitably 0.1 to 10 g/l, preferably 0.3 to 3 g/l, particularly preferably 0.5 to 1.5 g/l.

If the beverage contains fat in the form of milk or dairy products, the amount of added milk protein is preferably at least 50% by wt. and particularly preferably 60 to 80% by wt., based on the total milk protein amount in the beverage.

Although the known fermented beverages can be produced more easily, they have a typical, often undesired taste because of the aroma development of the bacterial cultures used.

Acid-fermented dairy products are produced by using bacterial cultures. The bacteria (from the families Streptococcus and Lactobacillus) ferment the lactose of milk into lactic acid because of their metabolic activity. As a result, the pH falls below the isoelectric point of casein of about 4.65. This results in a coagulation of the proteins and in a further degradation, partly into the amino acids. Moreover, the bacterial cultures produce flavoring substances (acetaldehyde, acetoin, diacetyl, acetone) which determine the flavor of the acid-fermented products (Dieter Osteroth (editor) Taschenbuch für Lebensmittelchemie und -technologien, Vol. 2, $1^{st}$ ed., Springer Verlag, Berlin, Heidelberg, 1991).

Thus the properties of a fermented milk product are preferred in an acid beverage with respect to stability because part of the protein structure has already been changed and will thus no longer be changed in an acid beverage. Sour or curdled dairy products, such as yoghurt, are thus particularly well suited for the production of beverages. However, they considerably determine the sensory characteristics.

Furthermore, the beverage according to the invention contains one or several hydrocolloids. Hydrocolloids are macromolecular, hydrophilic substances which are water-soluble or swell in water and predominantly pertain to the polysaccharides by reason of their chemical structure. A distinction is here made between natural vegetable hydrocolloids which are possibly modified, microbial biosynthetic hydrocolloids, and synthetic hydrocolloids (Lebensmittel-Lexikon, Täufel, Ternes, Tunger, Zobel, Behr's Verlag, Hamburg, 1993). All of these conventional hydrocolloids can be used in the beverage according to the invention, e.g. seaweed extracts such as agar-agar, carrageen, alginic acid, dulsane, furcellarane, eucheumane, hypneane, iridophycane, porphyrane, phyllophorane, gracelaria gum or lichenin, seed slime substances, such as carob flour, guar flour, tara flour, guar gum, tamarindene slime, quince seed slime, linseed slime, flea seed slime, tara gum or okra gum, plant exudates, such as gum arabicum, gum traganth or gum ghatti, starch, modified starches, cellulose derivatives, microbial polysaccharides such as dextrane, xanthane, gellane or β-1,3-glucane, or synthetic hydrocolloids such as polyvinyl pyrrolidone, polyvinyl alcohol, carboxylvinyl polymer, ethylene oxide polymers or acryl polymers. Preferred is the use of agar-agar, carrageen, alginic acid and the esters thereof, gum arabicum, carob flour, guar gum, linseed slime, dextrins, and specific starch derivatives and carboxymethylcellulose. Particularly preferred are alginic acid (E400) and the alginates (E401, E402, E403, E404, E405), such as propylene glycol alginate (E405). Highly esterified products are preferably used. The degree of esterification of the hydrocolloid is preferably at least 50%, particularly preferably 75 to 85%.

If mixtures of several hydrocolloids are used, the amount of the alginates in said mixture is preferably more than 50% by wt., based on the total weight of the hydrocolloid mixture. The total amount of hydrocolloids is normally 0.01 to 10 g/l, preferably 0.05 to 1 g/l and particularly preferably 0.3 to 0.6 g/l.

Preferably, the ratio between the total hydrocolloid amount and the total milk protein amount is 1:8 to 1:1, particularly preferably 1:3 to 1:5.

The beverage further contains calcium ions, normally of calcium salts. The calcium source used may be calcium salts, such as calcium gluconate, calcium citrate, calcium lactate, calcium ascorbate, calcium malate, calcium glycerophosphate, calcium caseinate, calcium hydroxide, calcium carbonate, calcium chloride and calcium phosphate.

Magnesium ions are normally added to the beverage in the form of magnesium salts, such as magnesium gluconate, magnesium citrate, magnesium lactate, magnesium ascorbate, magnesium malate, magnesium glycerophosphate, magnesium caseinate, magnesium hydroxide, magnesium carbonate, magnesium chloride and magnesium phosphate.

Of these salts, calcium lactate and magnesium lactate are preferred.

Suitably, the beverage according to the invention contains 0.1 to 1.2 g/l, preferably 0.2 to 0.6 g/l, calcium ions and 0.01 to 0.7 g/l, preferably 0.1 to 0.5 g/l, magnesium ions.

The ratio between calcium and magnesium ions is preferably within the range of 30:70 to 90:10, particularly preferably in the range of from 40:60 to 80:20, especially preferably in the range of from 50:50 to 70:30.

The beverage according to the invention has a pH ranging from 3.5 to 4.5, preferably of less than 3.8. The pH is adjusted by adding acids. Normally, the edible acids which are standard in food technology can be used, as well as their salts and inorganic acids. Illustrative examples of edible acids are malic, tartaric, citric, succinic, China, fumaric, lactic and ascorbic acid. Typical salts are the sodium and potassium salts of said acids. Examples of inorganic acids are sulfuric acid (E513), hydrochloric acid (E507) and orthophosphoric acid (E338). Lactic acid, citric acid, tartaric acid, malic acid, o-phosphoric acid and fumaric acid and the sodium and potassium salts thereof are preferably used.

Moreover, the beverage may contain further standard additions, such as antioxidants, sweetening agents, flavors, fruit juices or fruit juice concentrates.

Suitable natural antioxidants are tocopherols, L-ascorbic acid, the fatty acid esters thereof, such as L-ascorbyl palmitate or ascorbyl stearate, D-ascorbic acid and the sodium salt thereof, gallic-acid alkyl esters, such as propyl gallate, octyl gallate or dodecyl gallate, nordihydroguaiaretic acid, flavonoids such as quercetin, quercitrin or rutin, carnosolic and carnolic acid. Suitable synthetic antioxidants are tert.-butylhydroxyanisol, di-tert.-butylhydroxyanisol and tert.-butylhydroquinone. L-ascorbic acid, D-ascorbic acid and mixtures thereof are here preferred.

Sweeting agents can be added for a further refining of the beverage. Normally, sugar, sweeteners, sugar substitutes and compositions of sweeting agents and mixtures thereof can in general be used. Suitable sweeteners are acesulfame-K, aspartame, cyclamate, neohesperidine dihydrochalcone and saccharine. Vegetable sweeteners can also be used, for instance glycyrrhizine, hemandulcine, monefline, phyllodulcine, stevioside and thaumatine. Saccharine, cyclamate, aspartame and acesulfame-K are here preferred.

Suitable sugar substitutes are fructose and sugar alcohols, such as isomatitol (E953), lactitol (E966), maltitol, manitol (E421), sorbitol (E420), xylitol (E967) as well as mixtures thereof. Furthermore, mixtures of synthetic sweetener and dearomatized or non-dearomatized concentrated fruit preparations can be used as sweetening agents. Such compositions of sweeting agents are e.g. known from DE-B-3741961 or DE-B-3839869.

Sweetening agents may be added to the beverage according to the invention in such an amount that the resultant sweetening power is equivalent to an addition of up to 150 g/l saccharose, preferably 70 to 100 g/l saccharose.

Furthermore, the beverage according to the invention may contain flavors and/or fruit juices or fruit juice concentrates. Suitable flavors are natural, nature-identical or synthetic flavors. Fruit juices or fruit juice concentrates which may be used are those based on citrus fruits, such as orange, lemon, grapefruit or tangerine, and other fruits, such as apple, pear, apricot or pineapple, as well as berries, such as gooseberry, currant, grape, blueberry, strawberry, raspberry, blackberry or mulberry.

The beverage according to the invention may further contain carbon dioxide. Normally, the beverage contains 3 to 6 g/l $CO_2$.

The beverage can be filled into different containers; normally, glass bottles with screw caps, gas bottles with crown caps, plastic bottles with screw caps and cans as well as tetrapacks are used.

For the production of the beverage according to the invention the ingredients can intimately be mixed in the standard way in the desired mixing ratios.

The beverage is then homogenized and pasteurized. Homogenization is preferably carried out with the help of a high-pressure homogenizer at pressures between 10 and 100 MPa, preferably between 20 and 40 MPa. Pasteurization is normally carried out at temperatures of more than 80° C., preferably more than 85°, at holding periods of at least 10 seconds.

Furthermore, the present invention provides a kit from which the finished beverage can be produced in a conventional beverage bottling plant by adding water and optionally further additives as listed above. Said kit comprises a concentrate (A) containing at least one fat, one hydrocolloid, one milk protein, one acid and water, as well as a concentrate (B) containing at least one calcium salt and one magnesium salt in an aqueous solution.

As stated above for the beverage according to the invention, concentrate (A) is homogenized and pasteurized. Said concentrate is shelf stable from a physical and microbiological point of view. It can be transported in concentrated form and used for producing the beverage according to the invention. Furthermore, concentrate (A) may contain one or several antioxidants which have been selected from the above-mentioned compounds.

Optionally, an acid may be added to concentrate (B). Concentrate (B) may optionally contain sweetening agents and flavors, fruit juices or fruit juice concentrates. These additions are selected from the above additions indicated for the beverage of the invention.

For the production of a beverage the two concentrates are blended and mixed with water. The dosage of the concentrates is normally 50 to 150 kg per 1000 l of the finished beverage for concentrate (A) and 10 to 50 kg per 1000 l of the finished beverage for concentrate (B). During production carbon dioxide may also be added to the beverage.

The present invention shall now be further explained by the following examples and tests:

Long-term Stability

The following test series demonstrates the stabilization effect of the calcium and magnesium salts. To this end 8 acid milk-containing beverages were prepared that only differed from one another in the amount of the calcium and magnesium salts used. After an observation period of at least 4 weeks in which the beverages filled into glass bottles had been stored in a vibration-free manner, an optical inspection was carried out for evaluating the beverages. What was evaluated was the formation of a ring of fat components at the neck of the bottle (ring formation), the formation of a sediment at the bottom of the bottle (sediment) and the decrease in turbidity intensity, starting in the bottle neck (clarification).

| | Ca (mg/l) (amount %) | | Mg (mg/l) (amount %) | | ions (mg/l) | sediment | clarification | ring formation |
|---|---|---|---|---|---|---|---|---|
| 1 | 0 | | 0 | | 0 | +++ | +++ | +++ |
| 2 | 200 | (100) | 0 | (0) | 200 | ++ | ++ | ++ |
| 3 | 0 | (0) | 100 | (100) | 100 | ++ | ++ | + |
| 4 | 350 | (76) | 110 | (24) | 460 | o | o | o |
| 5 | 320 | (67) | 160 | (33) | 480 | − | − | + |
| 6 | 444 | (67) | 220 | (33) | 660 | − | − | + |
| 7 | 220 | (50) | 220 | (50) | 440 | − | o | + |
| 8 | 200 | (33) | 400 | (67) | 600 | − | − | + |

The following legend is applicable to the evaluation:

+++=very great flaw, unacceptable

++=great flaw, unacceptable

+=discernible flaw, possibly acceptable

0=minimal flaw, acceptable

−=no flaw, acceptable

The test series shows that the flaws that are normally optically visible, for example sedimentation, ring formation and clarification, are avoided by adding calcium and magnesium ions within the inventive range.

EXAMPLE 1

Preparation of a Concentrate (A)

A1) 200 g milk with a fat content of 3.5% are diluted with 500 g water, with 50 g whey protein concentrate (70%), 5.0 g gum arabicum and 5.0 g propylene glycol alginate and acidified with 10.0 g lactic acid. 3.0 g of ascorbic acid are then added and filled with water up to 1000 g. The concentrate is heated to 80° C., homogenized at 15 MPa and recooled to less than 25° C. after a holding period of one minute.

The concentrate prepared thereby has a total milk protein content of 41.8 g/kg, a total hydrocolloid amount of 10 g/kg and a total fat content of 7 g/kg. The pH of said concentrate is below 3.8.

(A2) 50 g milk with a fat content of 1.5% are diluted with 500 g water, mixed with 50 g whey protein concentrate (70%), 10 g propylene glycol alginate and acidified with 30 g lactic acid. 2 g of ascorbic acid are then added and filled with water up to 1000 g. The concentrate is heated to 80° C., homogenized at 150 MPa and recooled to less than 25° C. after a holding period of one minute.

The concentrate prepared thereby has a total milk protein content of 36.7 g/kg, a total hydrocolloid amount of 10 g/kg and a total fat content of 0.75 g/kg. The pH of said concentrate is below 3.8.

Preparation of a Concentrate (B)

(B1) 1.5 kg malic acid, 1.7 kg calcium-lactate-5-hydrate and 1.8 kg magnesium-chloride-6-hydrate are mixed with water and filled up to 20 kg.

(B2) 0.85 kg magnesium-hydroxy-carbonate-4-hydrate are dissolved in 3 kg lactic acid and 10 kg hot water, mixed with 2.4 kg calcium-lactate-5-hydrate and filled with water up to 20 kg.

Preparation of a Beverage from Concentrates (A) and (B)

50 g of concentrate (A1), as described above, and 20 g of concentrate (B1), as described above, are mixed with 90 g sugar and filled with impregnated water with a $CO_2$ content of about 5 g/l to 1 l. The beverage has an intensive milk-like turbidity and a pH of about 3.6.

100 g of concentrate (A2) and 20 g of concentrate (B2) are mixed with 90 g sugar and 1.5 g citric-acid monohydrate and filled with impregnated water with a $CO_2$ content of about 4 g/l to 1 l. The beverage has an intensive milk-like turbidity and a pH of about 3.6.

EXAMPLE 2

100 g milk with a fat content of 1.5% are mixed with 700 g water and 124 g invert syrup (72.7% water content, 66% inversion degree). 0.29 g whey protein concentrate (70%), 0.3 g propylene glycol alginate and 1.5 g sodium citrate are added. Furthermore, 1 g calcium-chloride-2-hydrate and 1 g magnesium-chloride-6-hydrate are added and dissolved. Subsequently, 70 g of a fruit juice concentrate mixture of orange and carrot juice are added by mixing and are filled with water to 1000 ml.

The concentrate mixture (46.0° Brix, refr. 20° C. uncorr., acid content as citric acid titrated up to pH 8.1; 6.8 g/100 g) yields a juice content of 25% (20% orange juice, 5% carrot juice).

The beverage is homogenized at 100 MPa and filled in a hot state (85° C.) into bottles and is then recooled. The beverage produced in this way has a total milk protein content of 3.6 g/l, a total hydrocolloid amount of 0.3 g/l and a total fat content of 1.5 g/l. The beverage has an intensive turbidity of a pastel-like orange color and a pH of 3.7.

What is claimed is:

1. An acid beverage at a pH of 3.5 to 4.5 comprising 0.003 to 3.8 g/L fat, 0.01 to 10 g/L hydrocolloid, 0.1 to 10 g/L milk protein, 0.1 to 1.2 g calcium ions and 0.01 to 0.7 g/L magnesium ions, the beverage being produced from non-fermented raw materials and the ratio between calcium and magnesium ions being in the range of 40:60 to 80:20.

2. The acid beverage of claim 1, further comprising an antioxidant.

3. The acid beverage of claim 1, further comprising a sweetening agent.

4. The acid beverage of claim 1, further comprising a flavoring substance.

5. The acid beverage of claim 1, wherein the hydrocolloid is an alginate.

6. The acid beverage of claim 1, wherein the pH is set by the addition of at least one acid.

7. A method of producing an acid beverage comprising an acid beverage at a pH of 3.5 to 4.5 comprising 0.003 to 3.8 g/L fat, 0.01 to 10 g/L hydrocolloid, 0.1 to 10 g/L milk protein, 0.1 to 1.2 g calcium ions and 0.01 to 0.7 g/L magnesium ions, the beverage being produced from non-fermented raw materials and the ratio between calcium and magnesium ions being in the range of 40:60 to 80:20, wherein the method comprises:

(a) mixing at least one fat, one milk protein, one hydrocolloid and calcium and magnesium ions with water;

(b) adjusting the pH of the mixture to 3.5 to 4.5; and (c) homogenizing and pasteurizing the mixture.

8. The method of claim 7, further comprising adding carbon dioxide to the beverage.

9. A kit for preparing an acid beverage at a pH of 3.5 to 4.5 comprising 0.003 to 3.8 g/L fat, 0.01 to 10 g/L hydrocolloid, 0.1 to 10 g/L milk protein, 0.1 to 1.2 g calcium ions and 0.01 to 0.7 g/L magnesium ions, the beverage being produced from non-fermented raw materials and the ratio between calcium and magnesium ions being in the range of 40:60 to 80:20, the kit comprising:

(a) a concentrate (A) comprising at least one fat, one hydrocolloid, one milk protein, one acid and water;

(b) a concentrate (B) comprising at least one calcium salt and one magnesium salt in an aqueous solution.

10. The kit of claim 9, wherein concentrate (B) further comprises an acid.

11. A method of producing an acid beverage at a pH of 3.5 to 4.5 comprising 0.003 to 3.8 g/L fat, 0.01 to 10 g/L hydrocolloid, 0.1 to 10 g/L milk protein, 0.1 to 1.2 g calcium ions and 0.01 to 0.7 g/L magnesium ions, the beverage being produced from non-fermented raw materials and the ratio between calcium and magnesium ions being in the range of 40:60 to 80:20, comprising mixing a concentrate (A) comprising at least one fat, one hydrocolloid, one milk protein, one acid and water with a concentrate (B) comprising at least one calcium salt and one magnesium salt in an aqueous solution under addition of water.

12. The method of claim 11, further comprising adding carbon dioxide to the beverage.

13. An acid beverage at a pH of 3.5 to 4.5 comprising 0.003 to 3.8 g/L fat, 0.01 to 10 g/L hydrocolloid, 0.1 to 10 g/L milk protein, 0.1 to 1.2 g calcium ions and 0.01 to 0.7 g/L magnesium ions, the beverage being produced from non-fermented raw materials and the ratio between calcium and magnesium ions being in the range of 40:60 to 80:20, further comprising one of a fruit juice and a fruit juice concentrate.

14. An acid beverage at a pH of 3.5 to 4.5 comprising 0.003 to 3.8 g/L fat, 0.01 to 10 g/L hydrocolloid, 0.1 to 10 g/L milk protein, 0.1 to 1.2 g calcium ions and 0.01 to 0.7 g/L magnesium ions, the beverage being produced from non-fermented raw materials and the ratio between calcium and magnesium ions being in the range of 40:60 to 80:20, further comprising carbon dioxide.

* * * * *

UNITED STATES PATENT AND TRADEMARK OFFICE
CERTIFICATE OF CORRECTION

PATENT NO.    : 6,413,561 B1
DATED         : July 2, 2002
INVENTOR(S)   : Matthias Sass and Susanne Rimmler It is certified that error appears in the above-identified patent and that said Letters Patent is hereby corrected as shown below:

<u>Title page,</u>
Insert -- [73] Assignee: Rudolf Wild GMBH & Co. KG
Rudolf-Wild-Strasse 4 - 6
Eppelheim, Fed Rep Germany D-69214 --

Signed and Sealed this

Twelfth Day of November, 2002

Attest:

Attesting Officer

JAMES E. ROGAN
*Director of the United States Patent and Trademark Office*